UNITED STATES PATENT OFFICE.

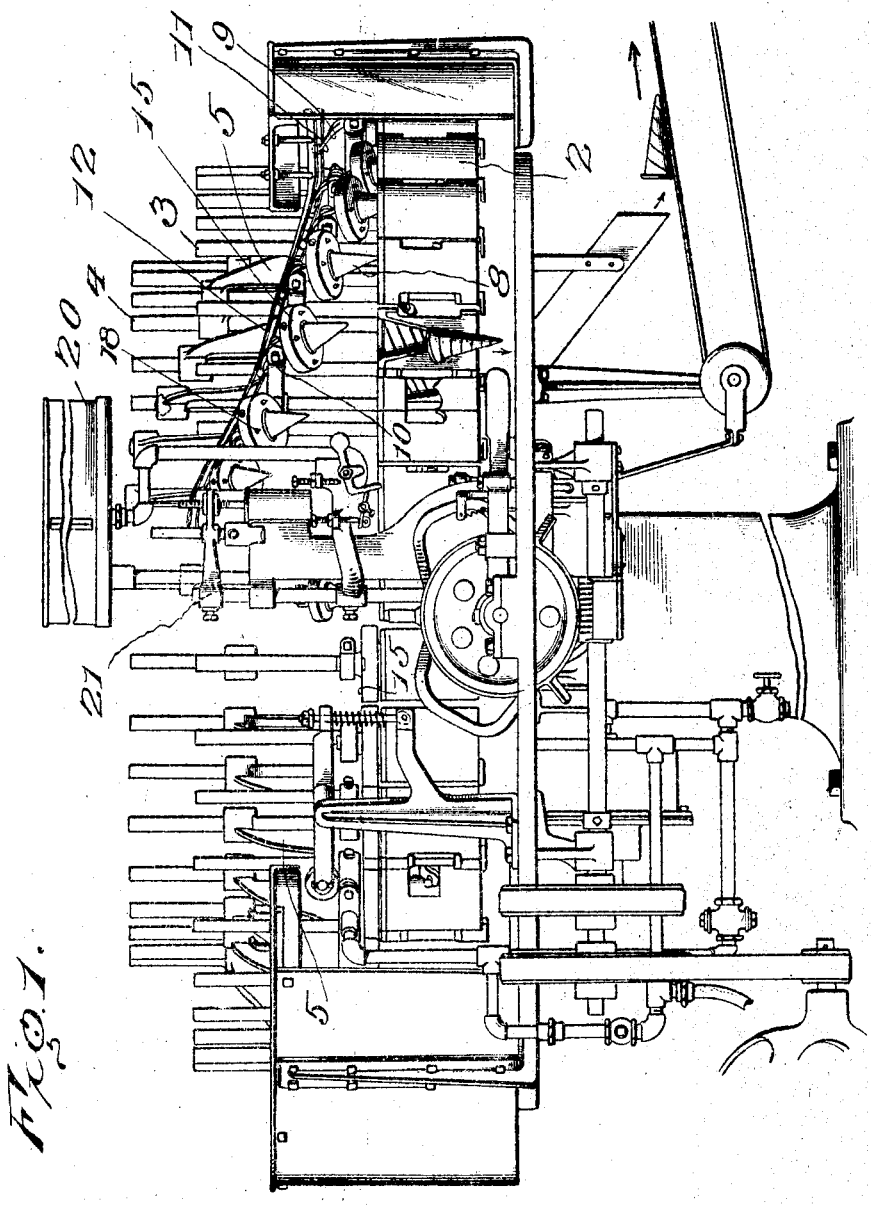

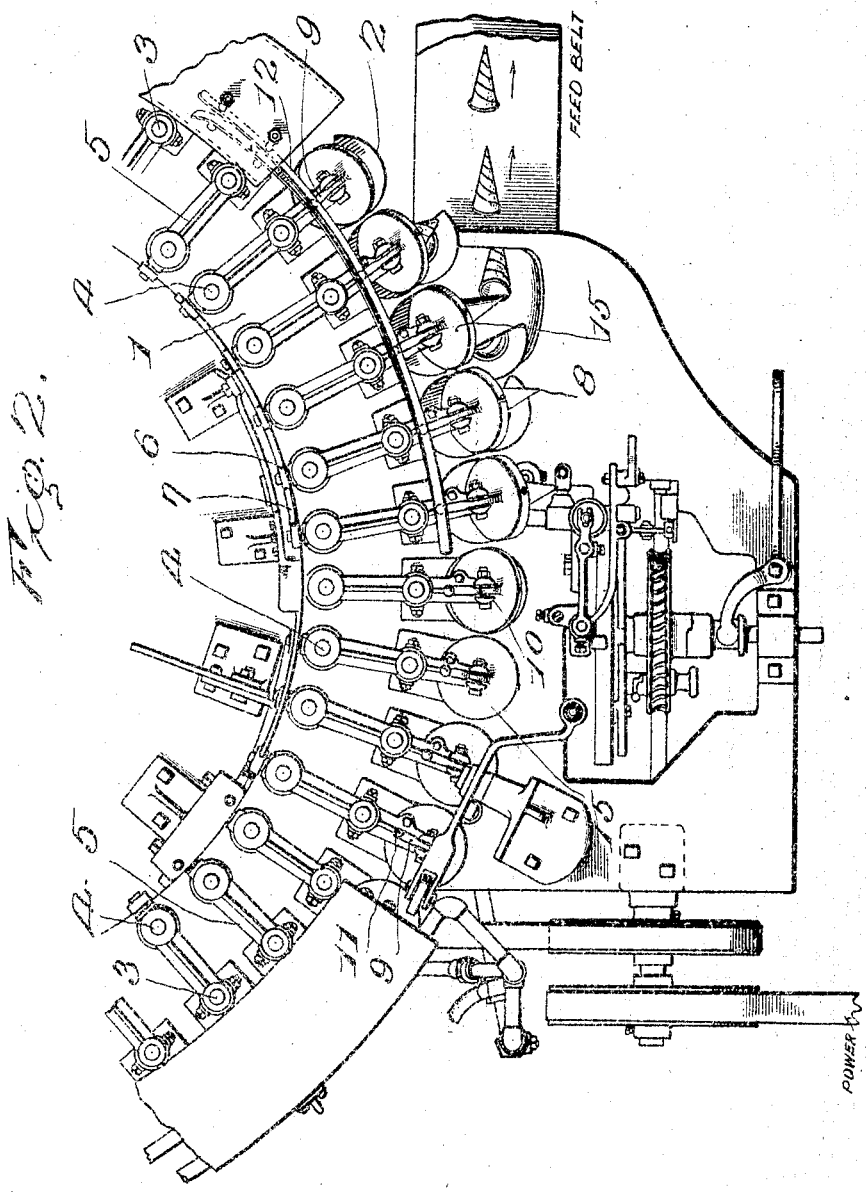

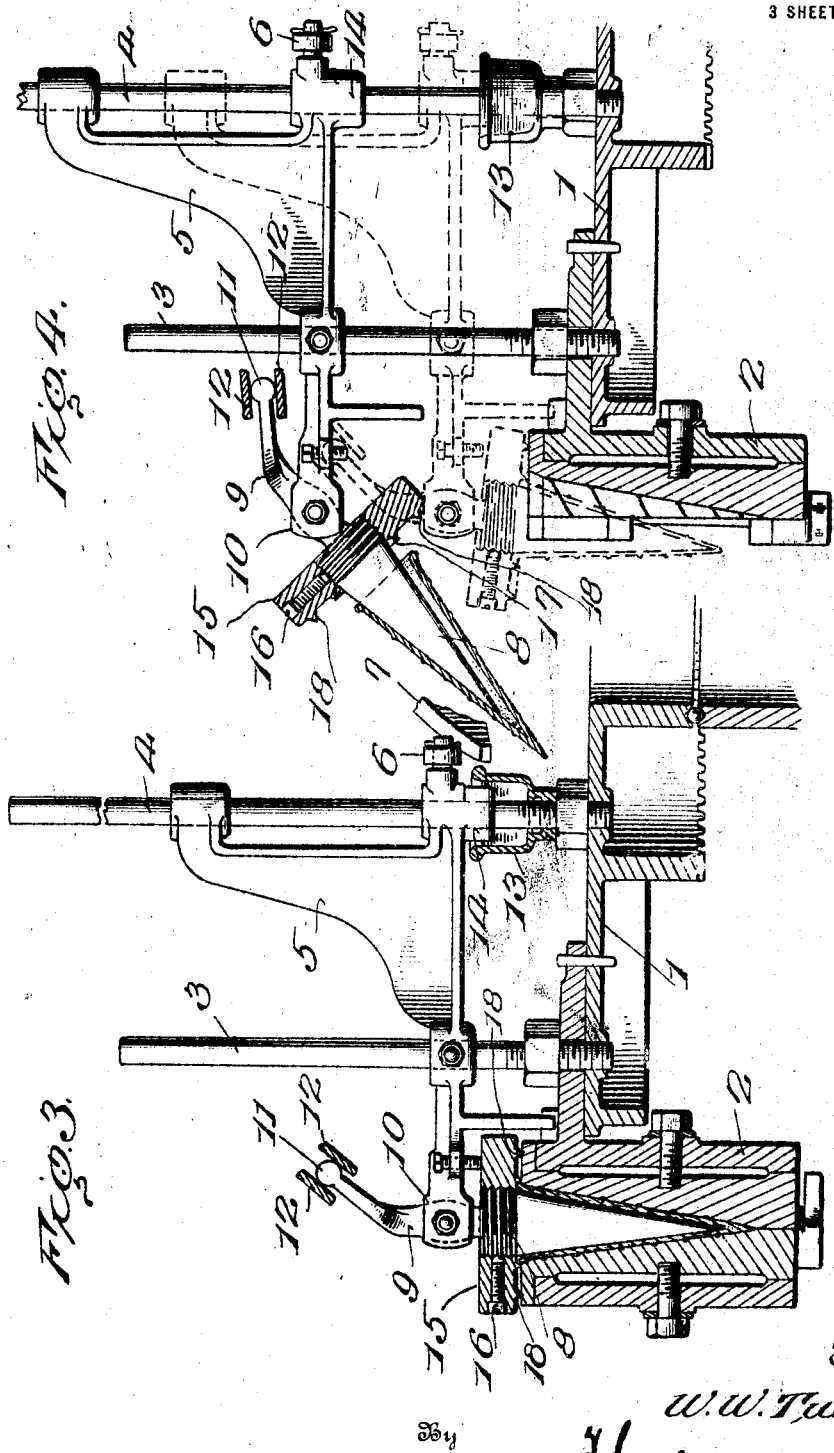

WERD W. TURNBULL, OF ASHEVILLE, NORTH CAROLINA, ASSIGNOR TO TURNBULL CONE MACHINE CO., OF ASHEVILLE, NORTH CAROLINA, A CORPORATION OF NORTH CAROLINA.

MACHINE FOR MAKING ICE-CREAM CONES.

1,299,635.  Specification of Letters Patent.  Patented Apr. 8, 1919.

Application filed September 1, 1917. Serial No. 189,368.

*To all whom it may concern:*

Be it known that I, WERD W. TURNBULL, a citizen of the United States, residing at Asheville, in the county of Buncombe and State of North Carolina, have invented certain new and useful Improvements in Machines for Making Ice-Cream Cones, of which the following is a specification.

This invention relates to machines for making ice cream cones of the type disclosed in an application for patent filed by me January 12, 1917, Serial No. 142,060. The present invention has special reference to means for discharging the baked cone from the mold in which it is formed, and seeks primarily to provide a mechanism by which the cone will be ejected positively without any breakage and the parts will operate continuously in a smooth easy manner.

The invention is illustrated in the accompanying drawings in which:

Figure 1 is a front elevation of so much of a machine for making ice cream cones as is necessary to a disclosure of the present invention;

Fig. 2 is a plan view of the same;

Fig. 3 is a sectional elevation through the mold and the parts immediately adjacent the same, showing the mold closed and the core within the mold;

Fig. 4 is a similar view showing the mold opened and the core withdrawn so as to eject the cone.

A machine for making ice cream cones in which my present invention is embodied comprises a container 20 for the batter and a plurality of molds which are successively carried past the container in a continuous series, a feeding mechanism, indicated at 21, being provided whereby a measured batch of dough will be fed into a mold which is adjacent the container in position to receive the dough. The molds are then carried past burners by which heat is applied to the molds and the cone cooked, the travel of the molds bringing them to a cam by which the molds are opened, the cones being thereby slightly loosened from the front side of the mold so that their discharge will be facilitated. The molds and cores are then carried past the dough container and the operation repeated. The mechanism for opening the mold and ejecting the formed cone employed in my former machine, above identified, was objectionable for the reason that it was complicated and cumbersome and the ejector would frequently impinge against the cone with such force as to break and destroy the same. My present invention dispenses with the ejector and changes the movement of the core so that the core performs the functions of the ejector and removes the formed cone without any breakage of the same.

Referring to the drawings particularly, the reference numeral 1 indicates a carrier upon which a plurality of mold holders 2 are secured, the carrier being caused to rotate about a vertical axis so as to carry the molds successively past the mixing, feeding and cooking apparatus. Upon the carrier 1 erect pairs of posts or guides, 3 and 4, upon which are slidably mounted arms 5 which carry the cores and each of which is provided at its inner end with a roller or pin 6 adapted to travel on a cam track 7 whereby the arm will be raised so as to move the core to a position above the mold, the cam track being so shaped or of such length that, after a fresh batch of dough has been placed in the mold, the core will be restored or permitted to return to its position therein. The mold as set forth in my aforesaid application is composed of mating members secured within the holder which consists of mating members hingedly connected so that the outer member may at the proper times swing toward or away from the inner member. The cores 8 are mounted at the outer ends of the arms 5 and, in the present arrangement, each core is provided with an upwardly extending handle member or post 9 which is pivoted within a yoke or bifurcation 10 at the outer end of the core-carrying arm. The handle member or lever 9 is curved inwardly toward its free end, as clearly shown in the drawings, and at its free end is constructed with a ball or knob 11 which is adapted to ride between the rails 12 of a stationary cam track. This cam track will be so disposed that as the arm 5 is raised by the member 6 at its inner end riding on the track 7, the free end of the lever or handle member 9 will be swung downwardly and inwardly toward the guide post 3, the core being thereby swung upwardly and outwardly, as shown in Fig. 2.

To keep the core carrying arm lubricated so that it will ride easily upon the guide post 4, a dash-pot 13 is provided around the lower end of said post and as the arm descends and reaches the lower limit of its movement, a boss 14 thereon will enter the dash-pot so as to dash the lubricant therefrom onto the arm so that the arm will move freely upon the guide post.

As shown in the drawings, the core is provided with an adjustable head 15 threaded onto the upper end of the core body and secured in the position to which it may be adjusted by a set screw 16 provided in the head and adapted to bear upon the upper threaded extremity or neck of the core body. The head is adapted to extend over the top of the mold and may be provided with a cutting rib 17 on its under side to trim the end of the cone. By properly adjusting the head relative to the body, the core may be permitted to enter the mold to any desired depth and the thickness of the cone thereby regulated. It is thus possible to so adjust each core relative to its respective mold that the cones produced in a given machine will be of uniform size notwithstanding slight variations which may occur in casting the molds.

In the operation of the machine the mold is closed and the batch of batter is fed into the same and the core then lowered into the mold so that the batter will be compressed and form a shell between the opposed surfaces of the core and the mold. The molds with the cores are then carried past the burners so that the batter will be cooked and as a mold containing a cooked cone leaves or passes beyond the burners, the outer member of the mold will engage a stationary cam and will be caused to swing away from the inner mold member and the cone. The core will retain the cone against the inner mold member so that the outer mold member will be freed from the cone, and practically simultaneously with the opening of the mold the core will start to rise owing to the engagement of the roller 6 upon the cam track 7 so that the cone will be loosened from the core. As soon as the mold has been opened, the cam track 12 will act upon the extremity 11 of the lever or handle member 9 and will swing the same inwardly and downwardly so that while the core is rising it will be simultaneously swinging outwardly so as to release and withdraw the cone from the inner mold member. As the core swings toward the position shown in Fig. 4 the cone will slide therefrom and will be deposited upon a conveyer by which it will be carried to the assembling mechanism or to workmen who will arrange the cones for the market.

The core and mold travel continuously and the cam track 12 causes the core to swing back to the mold after a fresh batch of batter has been fed into the mold. The point of the core will clear the upper end and front wall of the mold as it simultaneously descends and swings laterally and the core may ride on the inner surface of the front member of the mold until the head 15 impinges upon the upper end of the rear member of the mold, whereupon the head will rock and slide upon the rear mold member to bring the core into vertical position concentric with the mold. To aid in bringing the core finally into the desired concentric relation to the mold, I provide on the under side of the core head, a rib or spur 18 which is adapted to impinge upon the top of the mold at the rear thereof and serve as a fulcrum about which the head may rock to properly center the core.

It will be readily noted from the foregoing description, taken in connection with the accompanying drawings, that I have provided an exceedingly simple and efficient mechanism whereby the cooked cones will be removed from the molds. The necessity of an independent ejector which will operate only after the molds have been opened and will be apt to break the cones is overcome by the present mechanism and by the present invention the cones are successively removed gently from the molds and the core is given a continuous easy movement which will be free of any reversal in the direction of movement.

Having thus described the invention, what is claimed as new is:

1. In an ice cream cone machine, the combination of a mold consisting of relatively movable members and having its axis disposed vertically, a core adapted to fit within the mold and mounted for lateral swinging movement, and means for moving the core vertically as it swings laterally.

2. In a machine for making ice cream cones, the combination of a mold, a core mounted above the mold, and means for moving the core vertically and simultaneously moving it laterally with respect to the mold.

3. In a machine for making ice cream cones, the combination of a mold carrier, a mold mounted on said carrier, a core carrier mounted above the mold carrier and movable vertically with respect to the mold carrier, a core pivotally mounted upon the core carrier, and means for moving the core laterally about its pivot as the core carrier is moved vertically.

4. In a machine for making ice cream cones, the combination of a mold carrier, a core carrier disposed above the mold carrier, a mold on the mold carrier, a core pivoted to the core carrier, means for moving the core carrier vertically, and a cam disposed above the core carrier and acting on the core to swing the same about its pivot simultaneously with the vertical movement of the core carrier.

5. In a machine for making ice cream cones, the combination of a mold carrier, a mold thereon, a core carrier above the mold carrier, a core pivoted upon the core carrier and having an upwardly and inwardly extending lever at its upper end, a cam track arranged to be engaged by the free end of said lever whereby the core will be swung laterally relative to the mold, and means for moving the core vertically.

In testimony whereof I affix my signature.

WERD W. TURNBULL. [L. S.]